United States Patent
Chin et al.

(10) Patent No.: US 8,755,317 B2
(45) Date of Patent: Jun. 17, 2014

(54) HANDOVER FOR A MULTI-MODE MOBILE TERMINAL TO OPERATE IN CDMA 1X AND WIMAX OVERLAID NETWORKS

(75) Inventors: Tom Chin, San Diego, CA (US); Guangming Shi, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 212 days.

(21) Appl. No.: 13/267,791

(22) Filed: Oct. 6, 2011

(65) Prior Publication Data

US 2013/0010663 A1 Jan. 10, 2013

Related U.S. Application Data

(60) Provisional application No. 61/505,798, filed on Jul. 8, 2011.

(51) Int. Cl.
 *H04W 4/00* (2009.01)
(52) U.S. Cl.
 USPC .......................................... 370/311; 370/328
(58) Field of Classification Search
 USPC .................................................. 370/311, 328
 See application file for complete search history.

(56) References Cited

U.S. PATENT DOCUMENTS

| | | | |
|---|---|---|---|
| 6,625,467 B2 | 9/2003 | New et al. | |
| 7,904,122 B2* | 3/2011 | Kim et al. | 455/574 |
| 8,135,446 B2* | 3/2012 | Ji | 455/574 |
| 8,145,279 B2* | 3/2012 | Kim et al. | 455/574 |
| 8,264,994 B2* | 9/2012 | Chan et al. | 370/311 |
| 8,310,971 B2* | 11/2012 | Kim et al. | 370/311 |
| 2002/0006805 A1* | 1/2002 | New et al. | 455/525 |
| 2006/0040656 A1 | 2/2006 | Kotzin | |
| 2009/0280802 A1* | 11/2009 | Chin et al. | 455/426.1 |
| 2011/0053657 A1* | 3/2011 | Jl | 455/574 |
| 2012/0087291 A1* | 4/2012 | Kim et al. | 370/311 |

OTHER PUBLICATIONS

International Search Report and Written Opinion—PCT/US2012/045468—ISA/EPO—Oct. 9, 2012.

* cited by examiner

*Primary Examiner* — Brian O'Connor
(74) *Attorney, Agent, or Firm* — Tyler J. Overall

(57) ABSTRACT

Aspects of the present disclosure allow a mobile station (MS) to maintain data activity while performing handover operations within the WiMAX network and listening to a CDMA 1x paging cycle. According to aspects, the MS maintains timing of a base station (BS) in a first radio access technology (RAT) and a BS in a second RAT. The MS may determine an expected timing of a paging cycle in the second RAT and send a sleep request to the BS in the first RAT such that the sleep interval coincides with the timing of the paging cycle in the second RAT. The MS may perform operations to ensure a sleep interval, after performing handover operations, coincides with the timing of the paging cycle in the second RAT.

28 Claims, 9 Drawing Sheets

HANDOVER FOR A MULTI-MODE MOBILE TERMINAL TO OPERATE IN CDMA 1X AND WIMAX OVERLAID NETWORKS

CROSS-REFERENCE TO RELATED APPLICATIONS

This application claims benefit of U.S. Provisional Patent Application Ser. No. 61/505,798 filed Jul. 8, 2011, which is herein incorporated by reference.

BACKGROUND

1. Field

Certain aspects of the present disclosure generally relate to wireless communications and, more particularly, allowing a mobile station (MS) to listen to a paging message in a second radio access technology (RAT) while maintaining data activity in a first RAT.

2. Background

Orthogonal frequency-division multiplexing (OFDM) and orthogonal frequency division multiple access (OFDMA) wireless communication systems under IEEE 802.16 use a network of base stations to communicate with wireless devices (i.e., mobile stations) registered for services in the systems based on the orthogonality of frequencies of multiple subcarriers and can be implemented to achieve a number of technical advantages for wideband wireless communications, such as resistance to multipath fading and interference. Each base station (BS) emits and receives radio frequency (RF) signals that convey data to and from the mobile stations. For various reasons, such as a mobile station (MS) moving away from the area covered by one base station and entering the area covered by another, a handover (also known as a handoff) may be performed to transfer communication services (e.g., an ongoing call or data session) from one base station to another.

Three handover methods are supported in IEEE 802.16e-2005: Hard Handoff (HHO), Fast Base Station Switching (FBSS) and Macro Diversity Handover (MDHO). Of these, supporting HHO is mandatory, while FBSS and MDHO are two optional alternatives.

HHO implies an abrupt transfer of connection from one BS to another. The handover decisions may be made by the MS or the BS based on measurement results reported by the MS. The MS may periodically conduct an RF scan and measure the signal quality of neighboring base stations. The handover decision may arise, for example, from the signal strength from one cell exceeding the current cell, the MS changing location leading to signal fading or interference, or the MS requiring a higher Quality of Service (QoS). Scanning is performed during scanning intervals allocated by the BS. During these intervals, the MS is also allowed to optionally perform initial ranging and to associate with one or more neighboring base stations. Once a handover decision is made, the MS may begin synchronization with the downlink transmission of the target BS, may perform ranging if it was not done while scanning, and may then terminate the connection with the previous BS. Any undelivered Protocol Data Units (PDUs) at the BS may be retained until a timer expires.

When FBSS is supported, the MS and BS maintain a list of BSs that are involved in FBSS with the MS. This set is called a diversity set. In FBSS, the MS continuously monitors the base stations in the diversity set. Among the BSs in the diversity set, an anchor BS is defined. When operating in FBSS, the MS only communicates with the anchor BS for uplink and downlink messages including management and traffic connections. Transition from one anchor BS to another (i.e., BS switching) can be performed if another BS in the diversity set has better signal strength than the current anchor BS. Anchor update procedures are enabled by communicating with the serving BS via the Channel Quality Indicator Channel (CQICH) or the explicit handover (HO) signaling messages.

A FBSS handover begins with a decision by an MS to receive or transmit data from the anchor BS that may change within the diversity set. The MS scans the neighbor BSs and selects those that are suitable to be included in the diversity set. The MS reports the selected BSs, and the BS and the MS update the diversity set. The MS may continuously monitor the signal strength of the BSs that are in the diversity set and selects one BS from the set to be the anchor BS. The MS reports the selected anchor BS on CQICH or MS-initiated handover request message.

For MSs and BSs that support MDHO, the MS and BS maintain a diversity set of BSs that are involved in MDHO with the MS. Among the BSs in the diversity set, an anchor BS is defined. The regular mode of operation refers to a particular case of MDHO with the diversity set consisting of a single BS. When operating in MDHO, the MS communicates with all BSs in the diversity set of uplink and downlink unicast messages and traffic.

An MDHO begins when an MS decides to transmit or receive unicast messages and traffic from multiple BSs in the same time interval. For downlink MDHO, two or more BSs provide synchronized transmission of MS downlink data such that diversity combining is performed at the MS. For uplink MDHO, the transmission from an MS is received by multiple BSs where selection diversity of the information received is performed.

SUMMARY

In an aspect of the disclosure, a method for wireless communication is provided. The method generally includes maintaining timing of a serving base station (BS) in a first radio access technology (RAT) and a BS in a second RAT, determining, based on the timing of the serving BS in the first RAT and the BS in the second RAT, an expected timing of a paging cycle in the second RAT, sending a mobile sleep request (MOB_SLP-REQ) such that a sleep interval coincides with the timing of the paging cycle in the second RAT, performing operations related to handover from the serving BS to a target BS in the first RAT, and taking action to ensure a sleep interval, after performing the handover operations, coincides with the timing of the paging cycle in the second RAT.

In an aspect of the disclosure, an apparatus for wireless communication is provided. The apparatus generally includes means for maintaining timing of a serving base station (BS) in a first radio access technology (RAT) and a BS in a second RAT, means for determining, based on the timing of the serving BS in the first RAT and the BS in the second RAT, an expected timing of a paging cycle in the second RAT, means for sending a mobile sleep request (MOB_SLP-REQ) such that a sleep interval coincides with the timing of the paging cycle in the second RAT, means for performing operations related to handover from the serving BS to a target BS in the first RAT, and means for taking action to ensure a sleep interval, after performing the handover operations, coincides with the timing of the paging cycle in the second RAT.

In an aspect of the disclosure, an apparatus for wireless communication is provided. The apparatus generally includes at least one processor and a memory coupled to the at least one processor. The at least one processor is generally configured to maintain timing of a serving base station (BS) in a first radio access technology (RAT) and a BS in a second RAT, determine, based on the timing of the serving BS in the first RAT and the BS in the second RAT, an expected timing of a paging cycle in the second RAT, send a mobile sleep request (MOB_SLP-REQ) such that a sleep interval coincides with the timing of the paging cycle in the second RAT, perform operations related to handover from the serving BS to a target BS in the first RAT, and take action to ensure a sleep interval, after performing the handover operations, coincides with the timing of the paging cycle in the second RAT.

In an aspect of the disclosure, a computer-program product for wireless communication is provided The computer-program product generally includes a non-transitory computer-readable medium having code stored thereon. The code is generally executable by one or more processors for maintaining timing of a serving base station (BS) in a first radio access technology (RAT) and a BS in a second RAT, determining, based on the timing of the serving BS in the first RAT and the BS in the second RAT, an expected timing of a paging cycle in the second RAT, sending a mobile sleep request (MOB_SLP-REQ) such that a sleep interval coincides with the timing of the paging cycle in the second RAT, performing operations related to handover from the serving BS to a target BS in the first RAT, and taking action to ensure a sleep interval, after performing the handover operations, coincides with the timing of the paging cycle in the second RAT.

BRIEF DESCRIPTION OF THE DRAWINGS

So that the manner in which the above recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

Certain aspects of the present disclosure provide methods for maintaining data activity with a single RF chain MS in a WiMAX network while listening to a CDMA 1x page when a MS moves across WiMAX base stations.

An Example Wireless Communication System

The methods and apparatus of the present disclosure may be utilized in a broadband wireless communication system. The term "broadband wireless" refers to technology that provides wireless, voice, Internet, and/or data network access over a given area.

WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX offers the full mobility of cellular networks at broadband speeds.

Mobile WiMAX is based on OFDM (orthogonal frequency-division multiplexing) and OFDMA (orthogonal frequency division multiple access) technology. OFDM is a digital multi-carrier modulation technique that has recently found wide adoption in a variety of high-data-rate communication systems. With OFDM, a transmit bit stream is divided into multiple lower-rate substreams. Each substream is modulated with one of multiple orthogonal subcarriers and sent over one of a plurality of parallel subchannels. OFDMA is a multiple access technique in which users are assigned subcarriers in different time slots. OFDMA is a flexible multiple-access technique that can accommodate many users with widely varying applications, data rates, and quality of service requirements.

The rapid growth in wireless internets and communications has led to an increasing demand for high data rate in the field of wireless communications services. OFDM/OFDMA systems are today regarded as one of the most promising research areas and as a key technology for the next generation of wireless communications. This is due to the fact that OFDM/OFDMA modulation schemes can provide many advantages such as modulation efficiency, spectrum efficiency, flexibility, and strong multipath immunity over conventional single carrier modulation schemes.

IEEE 802.16x is an emerging standard organization to define an air interface for fixed and mobile broadband wireless access (BWA) systems. IEEE 802.16x approved "IEEE P802.16-REVd/D5-2004" in May 2004 for fixed BWA systems and published "IEEE P802.16e/D12 Oct. 2005" in October 2005 for mobile BWA systems. Those two standards defined four different physical layers (PHYs) and one media access control (MAC) layer. The OFDM and OFDMA physical layer of the four physical layers are the most popular in the fixed and mobile BWA areas respectively.

Figure 1:
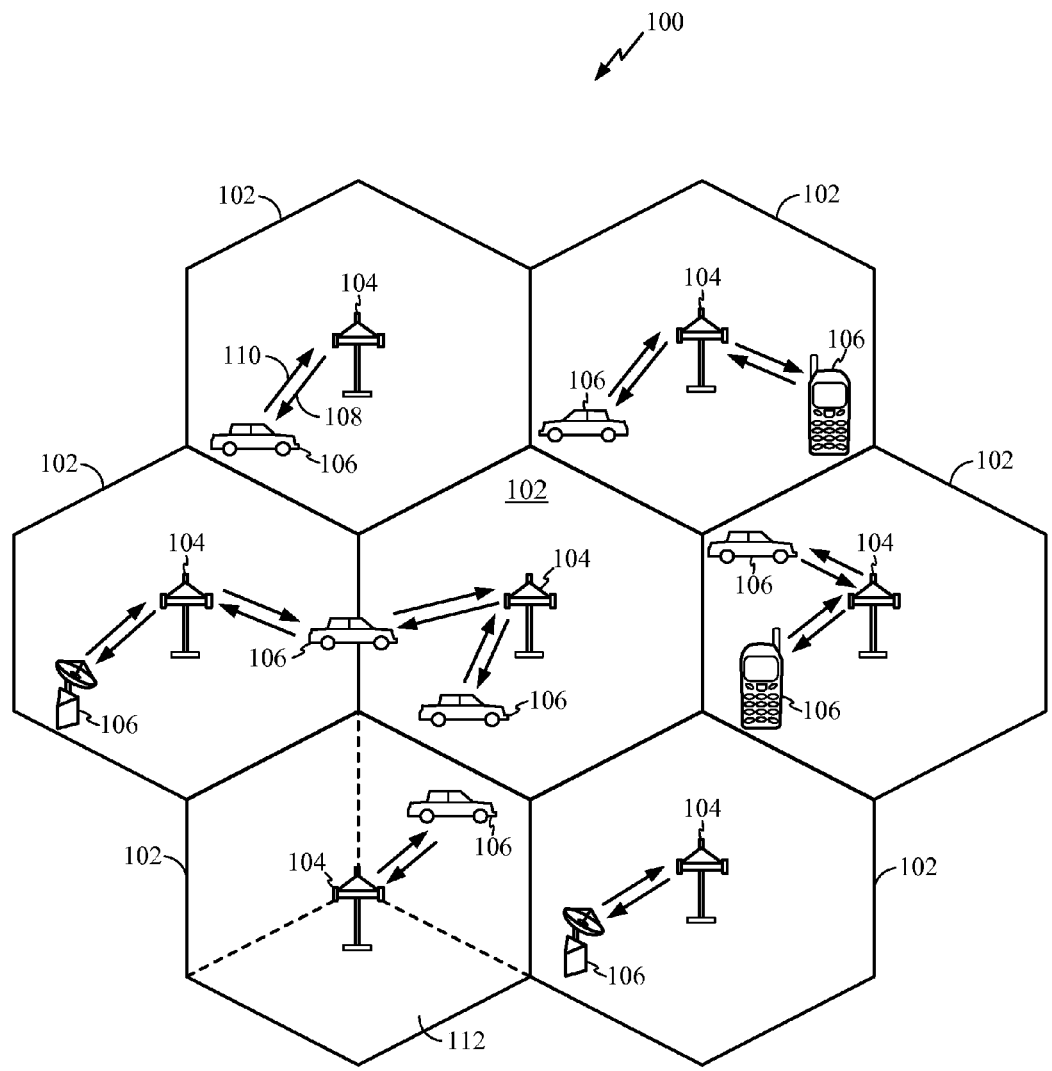
FIG. 1 illustrates an example wireless communication system, in accordance with certain aspects of the present disclosure.

FIG. 1 illustrates an example of a wireless communication system 100. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B, or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers (PCs), etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
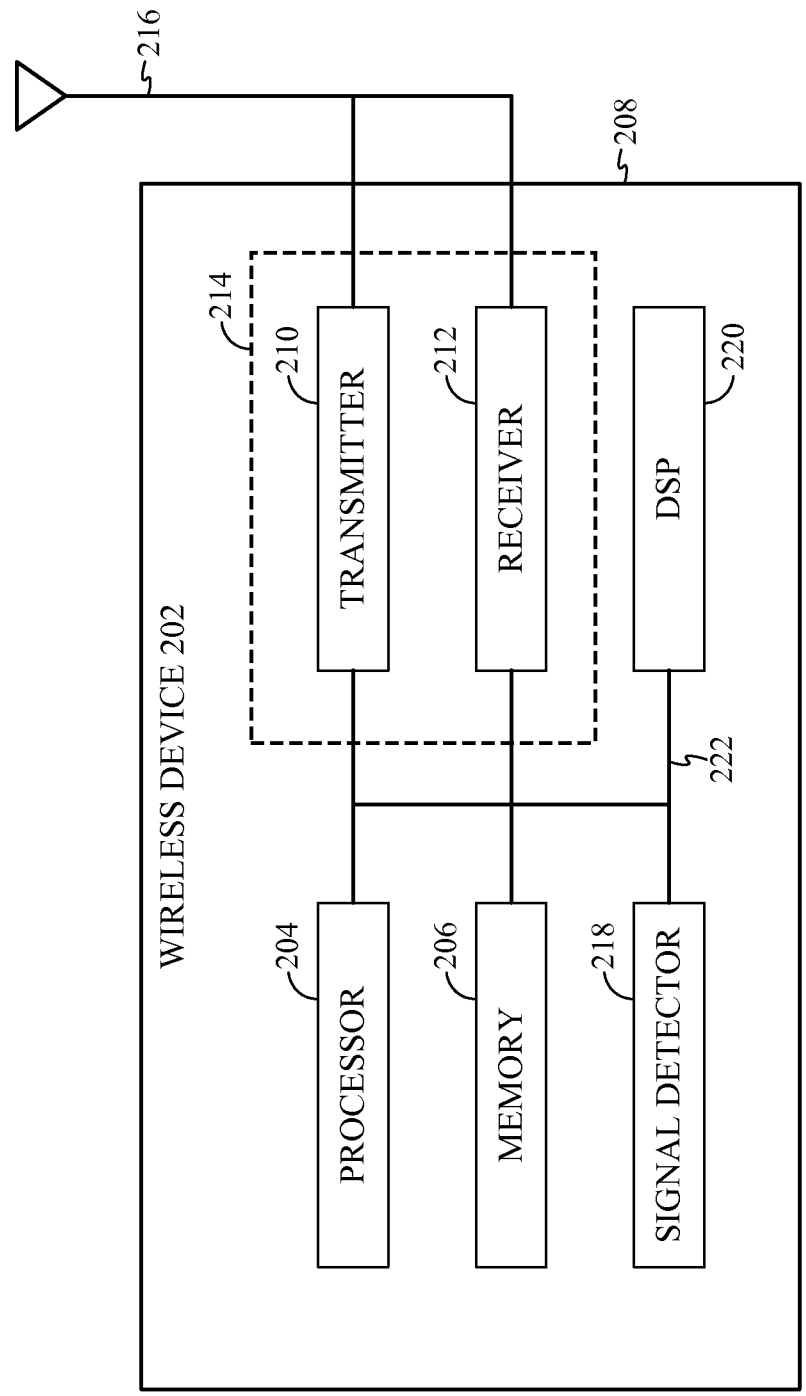
FIG. 2 illustrates various components that may be utilized in a wireless device, in accordance with certain aspects of the present disclosure.

FIG. 2 illustrates various components that may be utilized in a wireless device 202. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, pilot energy from pilot subcarriers or signal energy from the preamble symbol, power spectral density, and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
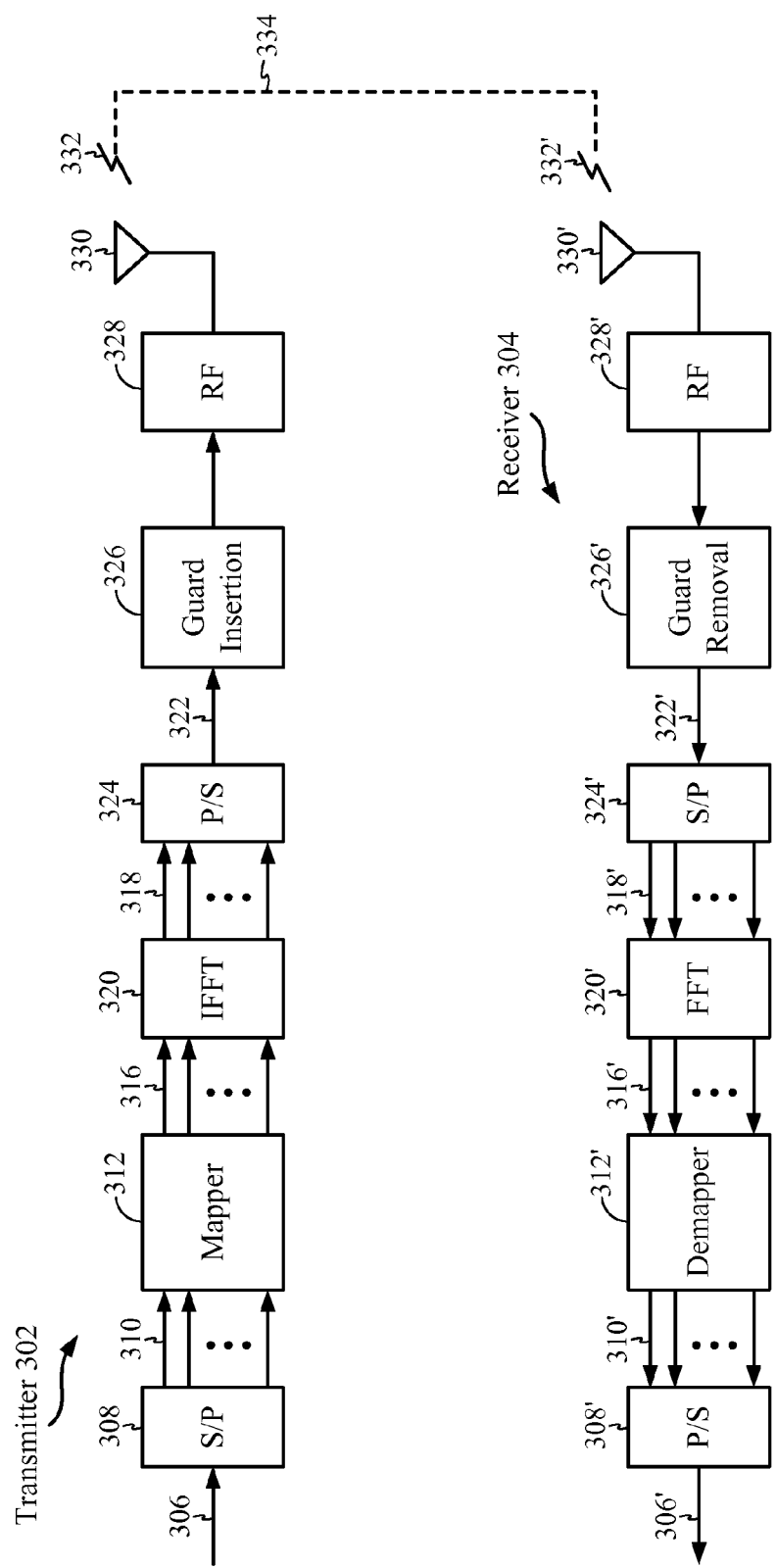
FIG. 3 illustrates an example transmitter and an example receiver that may be used within a wireless communication system that utilizes orthogonal frequency-division multiplexing and orthogonal frequency division multiple access (OFDM/OFDMA) technology, in accordance with certain aspects of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, $N_s$, is equal to $N_{cp}$ (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless communication system 100 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312, thereby outputting N parallel data streams 310'. A P/S converter 308' may combine the N parallel data streams 310' into a single data stream 306'. Ideally, this data stream 306' corresponds to the data 306 that was provided as input to the transmitter 302.

Handover for a Multi-Mode Mobile Terminal to Operate in CDMA1x and WiMax Overlaid Networks Aspects of the present disclosure allow a multimode mobile station to maintain data activity in a WiMAX network while listening to a CDMA 1x page when it moves across base stations in the WiMAX network. This may improve service continuity using single RF chain hardware.

Figure 4:
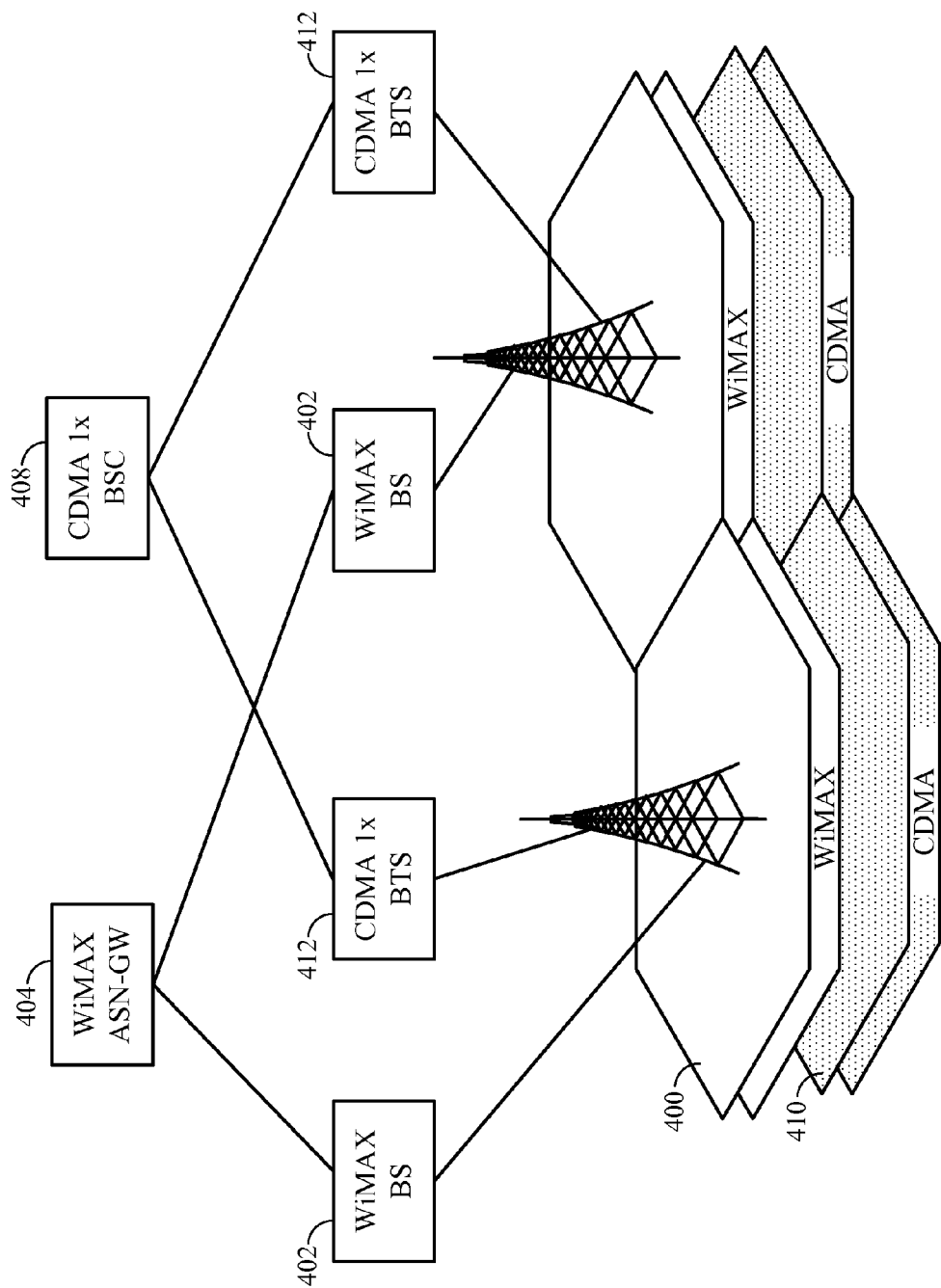
FIG. 4 illustrates an example worldwide interoperability for microwave access (WiMax) network overlaid on an example code division multiple access (CDMA) 1x network, in accordance with certain aspects of the present disclosure.

FIG. 4 illustrates a WiMAX network overlaid on CDMA a 1x network, in accordance with aspects of the present disclosure. In deployment of future broadband service, a WiMAX network 400, with base stations 402, may become overlaid with an existing CDMA 1x network 410, with base stations 412, to provide data service. WiMAX base stations 402 may communicate with an access service network gateway (ASN-GW) 404. CDMA 1x base stations 412 may communication with base station controller (BSC) 408.

A mobile station, while in a traffic mode with WiMAX network 400, may need to periodically tune to the CDMA 1x network 410 to listen to a page message. Unfortunately, a mobile station with a single RF chain may only transmit or receive with one RAT at a time. The WiMAX standard provides sleep mode features during which a mobile station may become unavailable in some recurring time interval. During the period of unavailability, the mobile station may power down to sleep, scan, or tune to other networks to listen to page messages.

According to certain aspects of the present disclosure, a mobile station may use the sleep mode to listen to a paging message in a CDMA 1x network, while maintaining a traffic connection in a WiMAX network for multi-mode operation. Because the sleep mode may be deactivated during handover within the WiMAX network, the multi-mode mobile station may need to reactivate the sleep mode upon handover to a target base station within the WiMAX network.

Base stations in the WiMAX network may be asynchronous, meaning that neighbor base stations may have different frame numbers at a given time instance. Accordingly, after handover from a WiMAX serving base station to a WiMAX target base station, a mobile station may need to readjust its sleep mode parameters to align with the paging interval of the CDMA 1x network.

Figure 5:
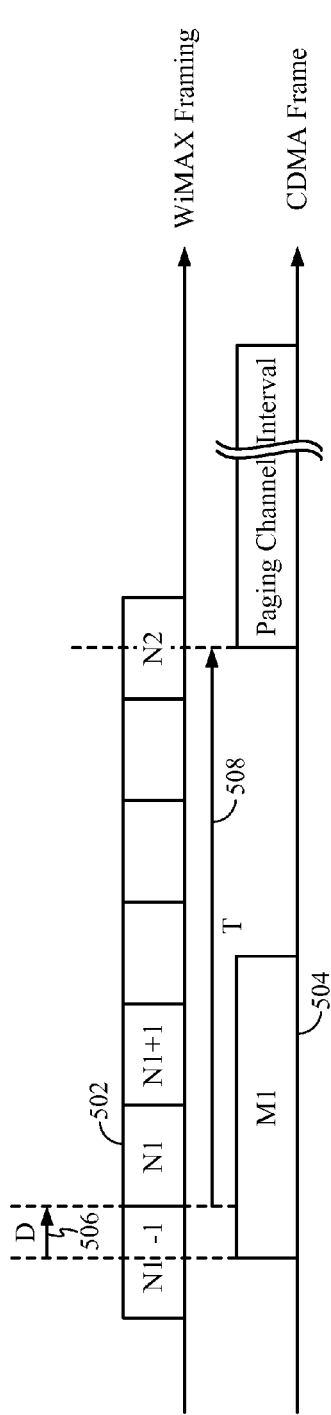
FIG. 5 illustrates an example of dual system timing, in accordance with certain aspects of the present disclosure.

FIG. 5 illustrates an example of maintaining dual system timing, in accordance with aspects of the present disclosure. In order to use the WiMAX sleep mode to listen to a paging message in a CDMA 1x network while maintaining a traffic connection in a WiMAX network, a mobile station may keep WiMAX and CDMA 1x stacks active and may acquire timing and configuration information for both systems. The mobile station may then continue to run both CDMA 1x system time, in 20 ms frames, and WiMAX base station framing.

To support dual system timing, a mobile station may know, at any time instance, information about the WiMAX and CDMA 1x networks. The mobile station may know the current WiMAX frame number 502 N1 and the current CDMA 1x system time 504 M1. The mobile station may know the delay 506 D, in WiMAX frame, from the start of the current CDMA 1x system time 504 M1 to the start of the current WiMAX frame 502 N1.

The mobile station may know the delay 508 T, in WiMAX frame, from the current WiMAX frame number 502 N1 to the next CDMA 1x page interval. The mobile station may start to monitor a quick paging channel (QPCH) during the next CDMA 1x paging interval. The time delay to the next CDMA 1x paging interval, T, may be calculated by Equation (1):

$$T=[(4*PGSLOT-M1) \bmod (64*2^{Slot\_Cycle\_Index})]*20 \text{ ms/wmx\_frame}-100 \text{ ms/wmx\_frame}-D$$

Slot_Cycle_Index=0, 1, . . . , 7 in Equation (1) may affect the length of the paging cycle interval which may be 1.28 sec*$2^{Slot\_Cycle\_Index}$.

PGSLOT in Equation (1) may be the allocated paging slot number of the CDMA 1x network. PGSLOT may be calculated by a mobile station using the International Mobile Subscriber Identifier (IMSI) hashed function as defined in CDMA standards.

100 ms is used in Equation (1) because the QPCH leads 100 ms ahead of the 80 ms of the paging slot.

Wmx_frame in Equation (1) is the length of the WiMAX frame duration in ms.

Once a traffic connection is set up, a mobile station may need to request to enter the sleep mode in order to listen to the CDMA 1x page messages. The sleep mode parameters in the Sleep Request (MOB_SLP-REQ) message sent by the mobile station to the serving WiMAX base station may include: an Initial Sleep Window (8 bits), a Listening Interval (8 bits), and a Start Frame (7 bits).

The Initial Sleep Window, S, (in a WiMAX frame) may be equal to Equation (2):

$$180 \text{ ms/wmx\_frame}+d+1$$

180 ms as used in Equation (2) represents the entire paging monitoring interval, including the QPCH and paging channel (PCH). Parameter d represents the additional WiMAX frame(s) reserved for a mobile station to tune to CDMA 1x network from the WiMAX network. The factor 1 is used in Equation (2) is to compensate for rounding down in Equation (4).

The Listening Interval, k, may be up to 255 frames and may be calculated by Equation (3):

$$\max\{k<256:(S+k) \text{ can divide } (1.28 \text{ sec}*2^{Slot\_Cycle\_Index}/\text{wmx\_frame})\}$$

The Start Frame Number may be up to 128 frames and may be calculated by Equation (4):

$$(M1+\text{FLOOR}(T)) \bmod 128$$

N1 in Equation (4) represents the current WiMAX frame number known to the mobile station by Dual System Timing, described above.

According to aspects of the present disclosure, the mobile station may only send a Sleep Request message whenever T is less than or equal to 127 frames. If T is greater than 127 frames, the mobile station may wait for some time before sending the Sleep Request message to the base station. This ensures that the mobile station may not miss the CDMA 1x paging interval. By using the dual system timing to query the delay until next CDMA 1x paging interval T, the mobile station may only send a Sleep Request message whenever T is less than or equal to 127 frames.

Figure 6:
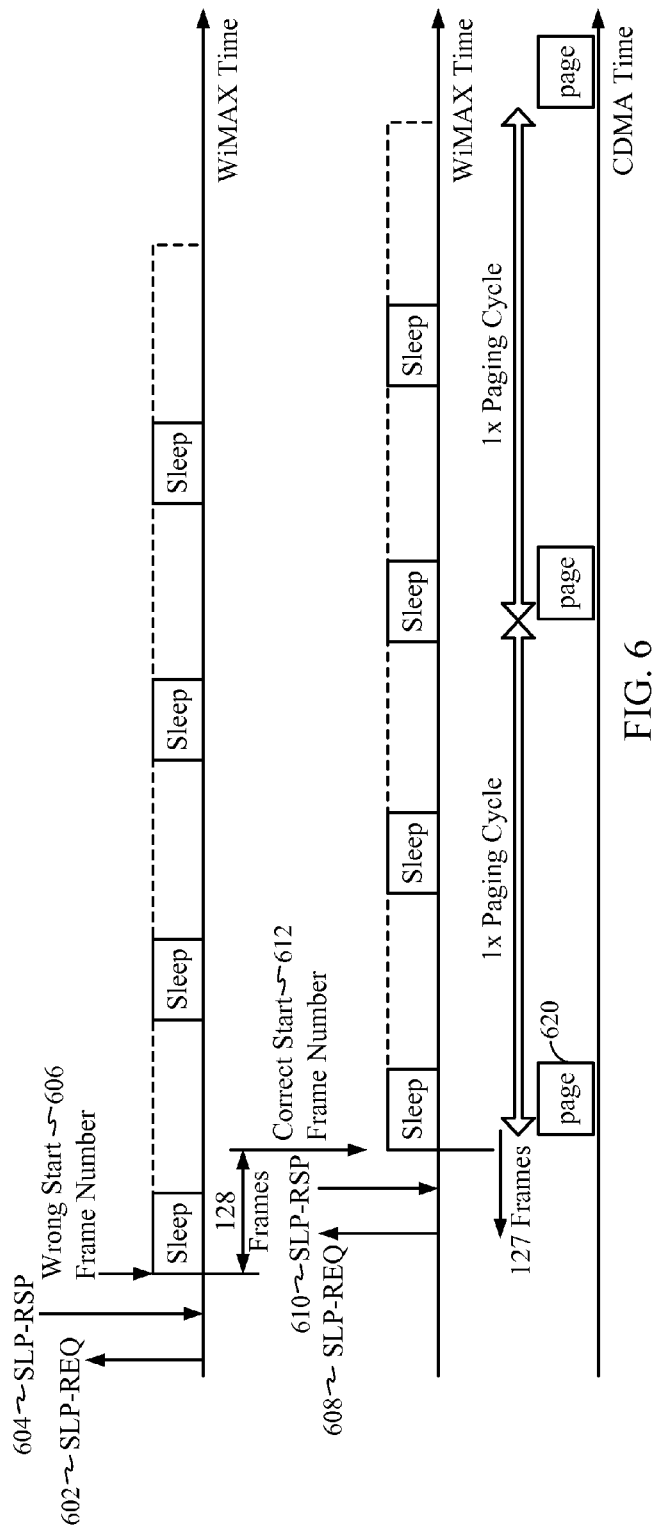
FIG. 6 illustrates example delays in a WiMAX frame to the next CDMA 1x paging interval, in accordance with certain aspects of the present disclosure.

FIG. 6 illustrates example delays in a WiMAX frame to the next CDMA 1x page interval. At 602, the mobile station sends a Sleep Request (SLP-REQ) and at 604, the mobile station receives a Sleep Response (SLP-RSP) from the serving base station. At 606, the mobile station enters a sleep state. Because T is greater than 127 frames, the sleep cycle of the mobile station misses the CDMA 1x page 620.

According to aspects of the present disclosure, the mobile station may only send a Sleep Request whenever T is less than or equal to 127 frames. For example, at 608, the mobile station sends a SLP-REQ, and at 610, the mobile station receives a SLP-RSP. At 612, the mobile station enters a sleep state. Since T is less than or equal to 127 frames, the mobile station may listen to the CDMA 1x page 620 during its sleep cycle.

According to WiMAX standards, the mobile station or base station shall stop the sleep mode whenever a handoff request (MOB_MSHO-REQ), handoff response (MOB_BSHO-REQ), or HO indication (MOB_HO-IND) is sent or received. After sending a MOB_MSHO-REQ or receiving MOB_BSHO-RSP, the mobile station may abort the sleep mode and may no longer listen to the CDMA 1x network page messages.

Figure 7:
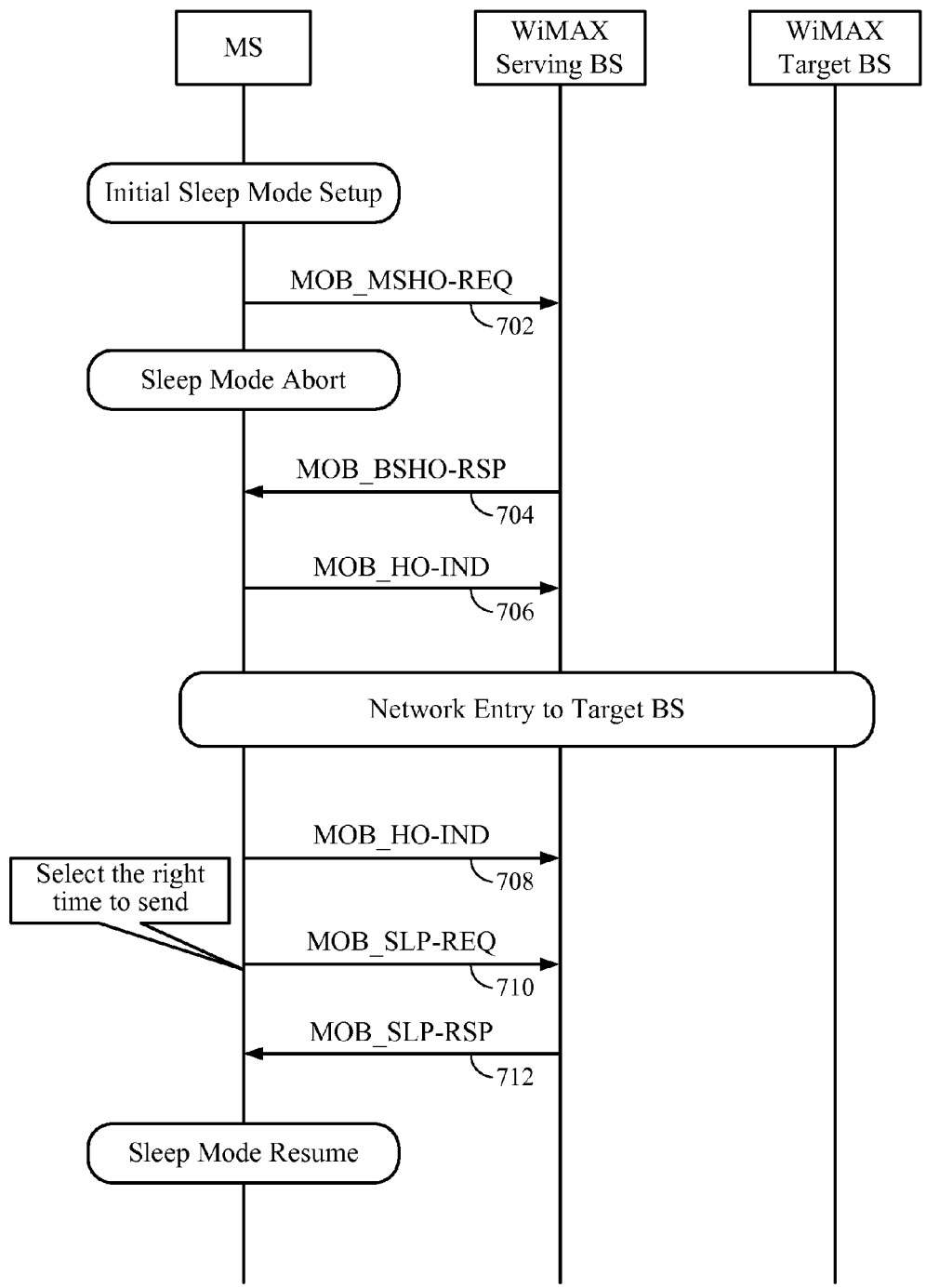
FIG. 7 illustrates an example procedure of a handover cancel where a MS returns to a serving BS, in accordance with certain aspects of the present disclosure.

FIG. 7 illustrates an example procedure of a handover cancel where a mobile station returns to the serving base station, in accordance with aspects of the present disclosure. When a handover cancel occurs, the mobile station may return to the serving WiMAX base station. At 702, a mobile station may send a handoff request (MOB_MSHO-REQ) to the serving base station. The handoff request may abort the sleep mode. At 704, the serving base station may send a handoff response (MOB_BSHO-RSP) and at 706, the mobile station may send a handover indication (MOB_HO-IND).

After network entry to the target base station, the mobile station may send a handover indication (MOB_HO-IND) 708 to the serving base station. The mobile station may select the right time to send a sleep request (MOB_SLP-REQ) message at 710. The sleep request message may use the same sleep mode parameters from the Initial Sleep Mode Setup procedure, including Start Frame Number, Initial Sleep Window, and Listening Interval. According to aspects of the present disclosure, a mobile station may use Dual System Timing to query the next CDMA 1x paging interval, T, so that the mobile station may send a sleep request whenever T is less than or equal to 127 frames, similar to the Initial Sleep Mode Setup. The mobile station may resume sleep mode and listen to the CDMA 1x paging interval after the serving base station sends a sleep response at 712.

Figure 8:
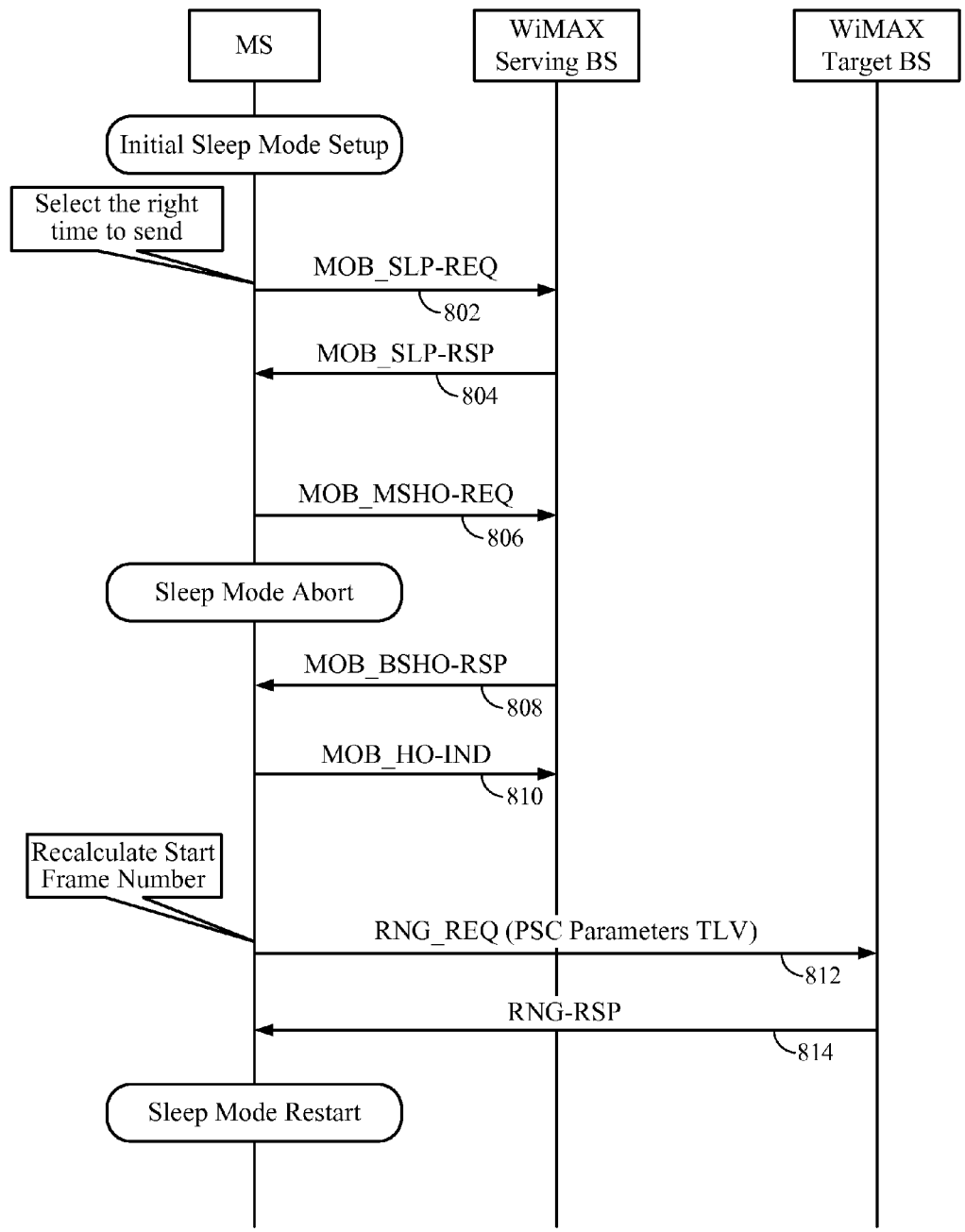
FIG. 8 illustrates an example procedure of a handover and reentry to a target BS, in accordance with certain aspects of the present disclosure.

FIG. 8 illustrates an example procedure of a mobile station handover from a serving WiMAX base station to a target WiMAX base station, in accordance with aspects of the present disclosure. During the Initial Sleep Mode Setup, the mobile station may calculate the correct time to send a sleep request to the serving base station so that the mobile station may listen to a CDMA 1x paging message. At 802, the mobile station may send a sleep request (MOB_SLP-REQ) message and at 804, the mobile station may receive a sleep response (MOB_SLP-RSP) message from the serving base station. At 806, the mobile station may send a handoff request (MOB_MSHO-REQ) message to the serving base station, which may abort the sleep mode. At 808, the mobile station may receive a handoff response (MOB_BSHO-RSP) message. At 810, the mobile station may send a handover indication (MOB_HO-IND) message.

Because base stations in a WiMAX network may be asynchronous, when handover to a target WiMAX base station begins, the mobile station may need to query information regarding the current frame number N1 and delay to the next CDMA 1x paging interval T before the mobile station may perform ranging procedures. The mobile station may recalculate the Start Frame Number and send a ranging request (RNG_REQ) message to the target base station at 812.

WiMAX standards allow using ranging procedures to activate the sleep mode in Power Saving Class Parameters TLV. All parameters in Initial Sleep Mode Setup, including Initial Sleep Window and Listening Interval may be reused except for Start Frame Number. Start Frame Number in Power Saving Class Parameters TLV may have 8 bits, requiring a different formula for calculation. The Start Frame Number may be calculated by Equation (5):

$$\text{Start Frame Number} = (N1 + \text{FLOOR}(T)) \bmod 256$$

Since the Start Frame Number may have 8 bits in Power Saving Class Parameters TLV, there may be no specific timing required for sending a ranging request message. Accordingly, the mobile station may send ranging request message at any time. After receiving a ranging response (RNG-RSP) message 814 from the target base station, the mobile station may activate the sleep mode and listen to the CDMA 1x paging interval.

Figure 9:
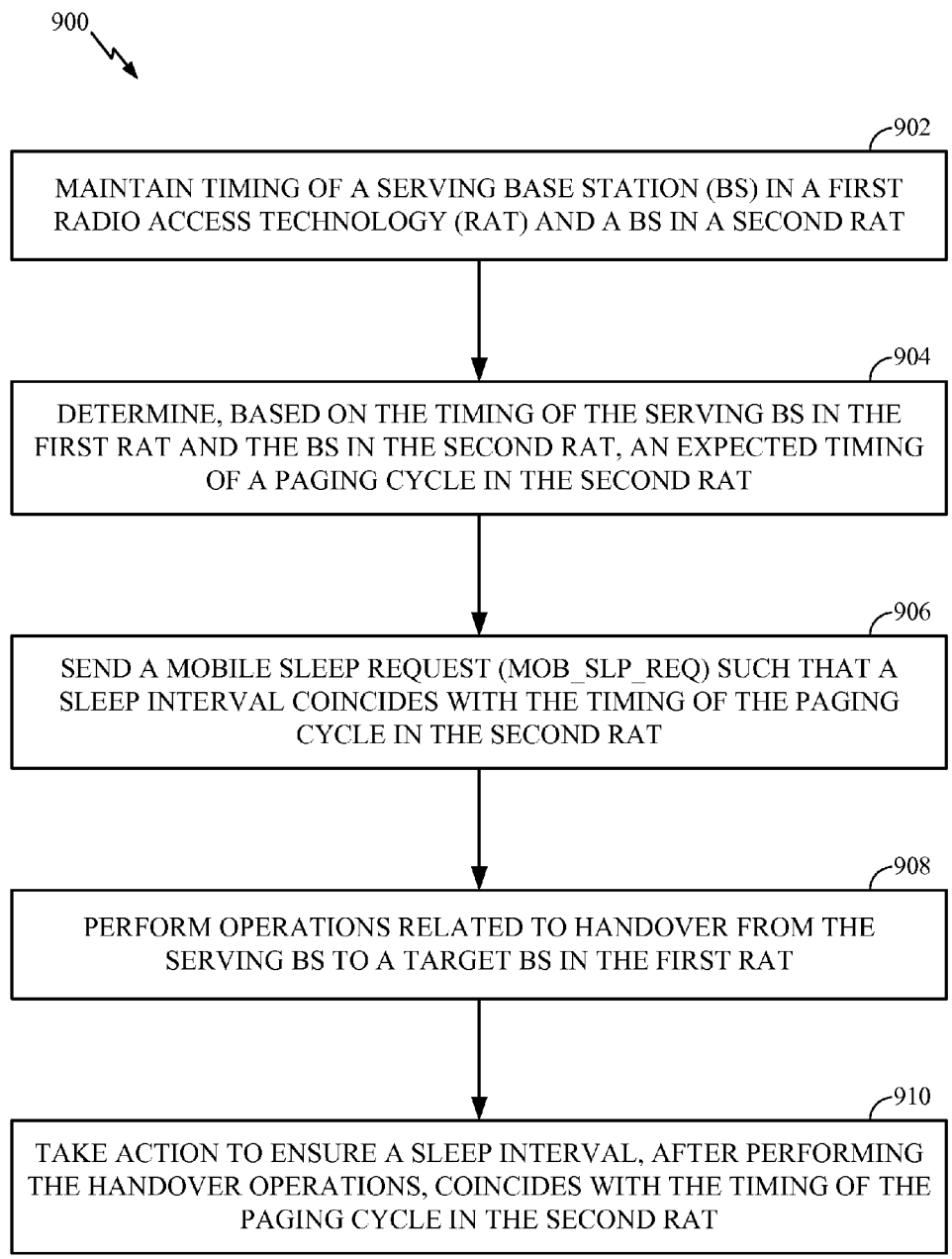
FIG. 9 illustrates example operations performed, for example by a MS, in accordance with aspects of the present disclosure.

FIG. 9 illustrates example operations 900 that may be performed, for example, by a mobile station in accordance with aspects of the present disclosure. At 902, the mobile station may maintain timing of a serving base station (BS) in a first radio access technology (RAT) and a BS in a second RAT. At 904, the MS may determine, based on the timing of the serving BS in the first RAT and the BS in the second RAT, an expected timing of a paging cycle in the second RAT. At 906, the MS may send a mobile sleep request (MOB_SLP-REQ) such that a sleep interval coincides with the timing of the paging cycle in the second RAT. At 908, the MS may perform operations related to handover from the serving BS to a target BS in the first RAT. At 910, the MS may take action to ensure a sleep interval, after performing the handover operations, coincides with the timing of the paging cycle in the second RAT.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Figure 9A:
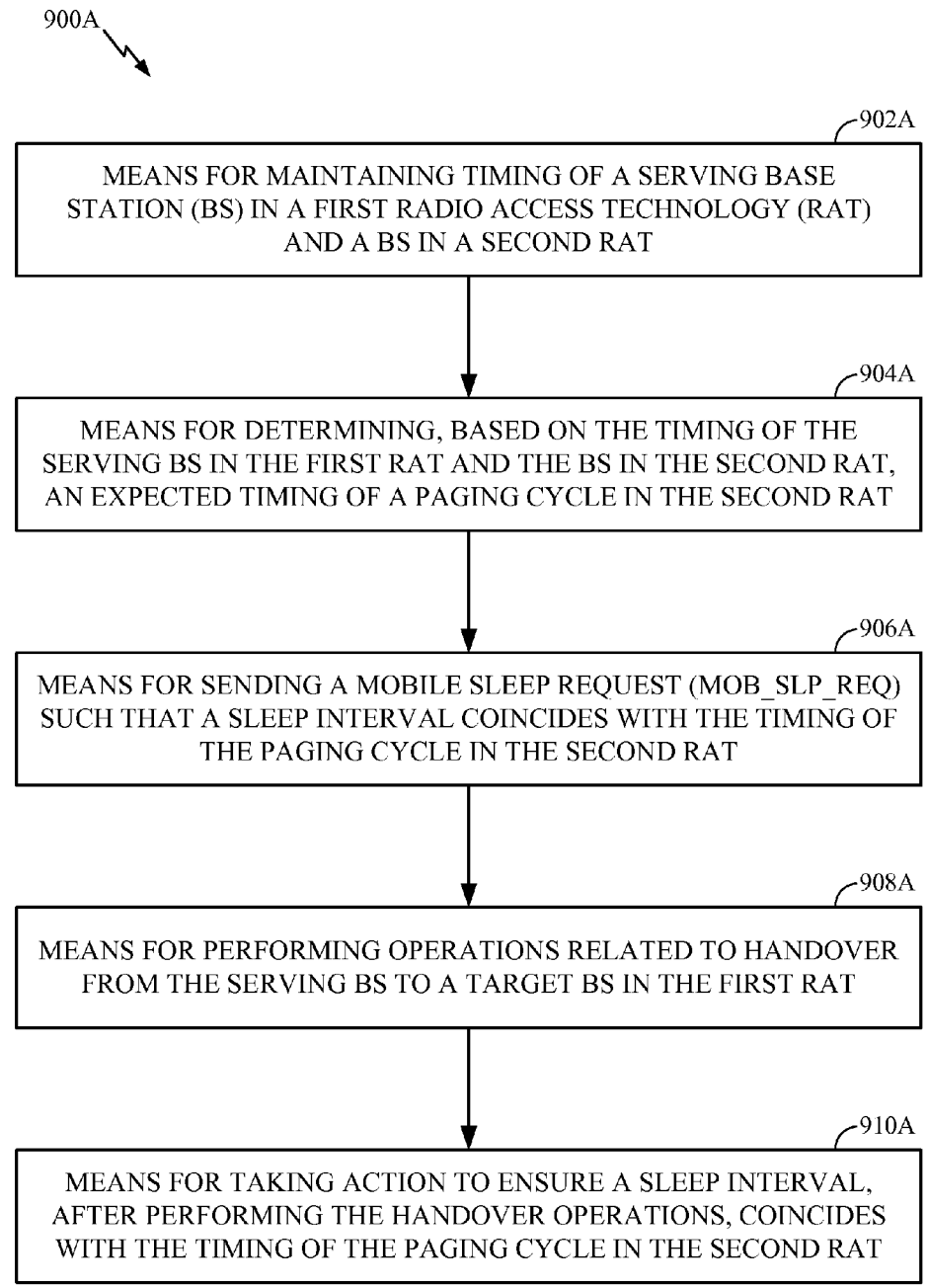
FIG. 9A illustrates example components capable of performing the operations illustrated in FIG. 9.

The various operations of methods described above may be performed by various hardware and/or software component(s) and/or module(s) corresponding to means-plus-function blocks illustrated in the Figures. For example, blocks 902-910 illustrated in FIG. 9 correspond to means-plus-function blocks 902A-910A illustrated in FIG. 9A. More generally, where there are methods illustrated in Figures having corresponding counterpart means-plus-function Figures, the operation blocks correspond to means-plus-function blocks with similar numbering.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication, comprising:
   maintaining timing of a serving base station (BS) in a first radio access technology (RAT) and a BS in a second RAT;
   determining, based on the timing of the serving BS in the first RAT and the BS in the second RAT, an expected timing of a paging cycle in the second RAT;
   sending a mobile sleep request such that a sleep interval coincides with the timing of the paging cycle in the second RAT, wherein sending the mobile sleep request comprises sending the mobile sleep request when a delay from a current frame number of the first RAT to a next paging cycle in the second RAT is less than or equal to a maximum start frame number available to the first RAT;
   performing operations related to handover from the serving BS to a target BS in the first RAT; and
   taking action to ensure a sleep interval, after performing the handover operations, coincides with the timing of the paging cycle in the second RAT.

2. The method of claim 1, wherein the first RAT is WiMAX (Worldwide Interoperability for Microwave Access) and the second RAT is CDMA 1x (Code Division Multiple Access).

3. The method of claim 1, wherein:
   performing operations related to handover comprises returning to the serving BS; and
   taking action to ensure the sleep interval coincides with the timing of the paging cycle in the second RAT comprises resending the mobile sleep request.

4. The method of claim 3, wherein resending the mobile sleep request comprises resending a start frame number, an initial sleep window, and a listening interval.

5. The method of claim 1, wherein:
   performing operations related to handover comprises initiating handover to the target BS; and
   taking action to ensure the sleep interval coincides with the timing of the paging cycle in the second RAT comprises sending a ranging request to the target BS.

6. The method of claim 5, wherein the sending the ranging request comprises sending a recalculated start frame number and resending an initial sleep window and a listening interval.

7. The method of claim 1, wherein determining an expected timing of a paging cycle in the second RAT comprises determining a delay from a current frame number of the serving BS in the first RAT to the start of the next paging cycle interval in the second RAT.

8. An apparatus for wireless communication, comprising:
means for maintaining timing of a serving base station (BS) in a first radio access technology (RAT) and a BS in a second RAT;
means for determining, based on the timing of the serving BS in the first RAT and the BS in the second RAT, an expected timing of a paging cycle in the second RAT;
means for sending a mobile sleep request such that a sleep interval coincides with the timing of the paging cycle in the second RAT, wherein sending the mobile sleep request comprises sending the mobile sleep request when a delay from a current frame number of the first RAT to a next paging cycle in the second RAT is less than or equal to a maximum start frame number available to the first RAT;
means for performing operations related to handover from the serving BS to a target BS in the first RAT; and
means for taking action to ensure a sleep interval, after performing the handover operations, coincides with the timing of the paging cycle in the second RAT.

9. The apparatus of claim 8, wherein the first RAT is WiMAX (Worldwide Interoperability for Microwave Access) and the second RAT is CDMA 1x (Code Division Multiple Access).

10. The apparatus of claim 8, wherein:
the means for performing operations related to handover comprises means for returning to the serving BS; and
the means for taking action to ensure the sleep interval coincides with the timing of the paging cycle in the second RAT comprises means for resending the mobile sleep request.

11. The apparatus of claim 10, wherein the means for resending the mobile sleep request comprises means for resending a start frame number, an initial sleep window, and a listening interval.

12. The apparatus of claim 8, wherein:
the means for performing operations related to handover comprises means for initiating handover to the target BS; and
the means for taking action to ensure the sleep interval coincides with the timing of the paging cycle in the second RAT comprises means for sending a ranging request to the target BS.

13. The apparatus of claim 12, wherein the means for sending the ranging request comprises means for sending a recalculated start frame number and resending an initial sleep window and a listening interval.

14. The apparatus of claim 8, wherein the means for determining an expected timing of a paging cycle in the second RAT comprises means for determining a delay from a current frame number of the serving BS in the first RAT to the start of the next paging cycle interval in the second RAT.

15. An apparatus for wireless communication, comprising:
a processing system configured to:
maintain timing of a serving base station (BS) in a first radio access technology (RAT) and a BS in a second RAT;
determine, based on the timing of the serving BS in the first RAT and the BS in the second RAT, an expected timing of a paging cycle in the second RAT;
send a mobile sleep request such that a sleep interval coincides with the timing of the paging cycle in the second RAT, wherein sending the mobile sleep request comprises sending the mobile sleep request when a delay from a current frame number of the first RAT to a next paging cycle in the second RAT is less than or equal to a maximum start frame number available to the first RAT;
perform operations related to handover from the serving BS to a target BS in the first RAT; and
take action to ensure a sleep interval, after performing the handover operations, coincides with the timing of the paging cycle in the second RAT; and
a memory coupled to the processing system.

16. The apparatus of claim 15, wherein the first RAT is WiMAX (Worldwide Interoperability for Microwave Access) and the second RAT is CDMA 1x (Code Division Multiple Access).

17. The apparatus of claim 15, wherein:
the processing system is configured to perform operations related to handover by returning to the serving BS; and
the processing system is configured to take action to ensure the sleep interval coincides with the timing of the paging cycle in the second RAT by resending the mobile sleep request.

18. The apparatus of claim 17, wherein the processing system is configured to resend the mobile sleep request by resending a start frame number, an initial sleep window, and a listening interval.

19. The apparatus of claim 15, wherein:
the processing system is configured to perform operations related to handover by initiating handover to the target BS; and
the processing system is configured take action to ensure the sleep interval coincides with the timing of the paging cycle in the second RAT by sending a ranging request to the target BS.

20. The apparatus of claim 19, wherein the processing system is configured to send the ranging request by sending a recalculated start frame number and resending an initial sleep window and a listening interval.

21. The apparatus of claim 15, wherein the processing system is configured to determine an expected timing of a paging cycle in the second RAT by determining a delay from a current frame number of the serving BS in the first RAT to the start of the next paging cycle interval in the second RAT.

22. A computer-program product for wireless communications, the computer-program product comprising a non-transitory computer-readable medium having code stored thereon, the code executable by one or more processors for:
maintaining timing of a serving base station (BS) in a first radio access technology (RAT) and a BS in a second RAT;
determining, based on the timing of the serving BS in the first RAT and the BS in the second RAT, an expected timing of a paging cycle in the second RAT;
sending a mobile sleep request such that a sleep interval coincides with the timing of the paging cycle in the second RAT, wherein sending the mobile sleep request comprises sending the mobile sleep request when a delay from a current frame number of the first RAT to a next paging cycle in the second RAT is less than or equal to a maximum start frame number available to the first RAT;
performing operations related to handover from the serving BS to a target BS in the first RAT; and
taking action to ensure a sleep interval, after performing the handover operations, coincides with the timing of the paging cycle in the second RAT.

23. The computer-program product of claim 22, wherein the first RAT is WiMAX (Worldwide Interoperability for Microwave Access) and the second RAT is CDMA 1x (Code Division Multiple Access).

24. The computer-program product of claim 22, wherein:
the code for performing operations related to handover comprises code for returning to the serving BS; and
the code for taking action to ensure the sleep interval coincides with the timing of the paging cycle in the second RAT comprises code for resending the mobile sleep request.

25. The computer-program product of claim 24, wherein the code for resending the mobile sleep request comprises code for resending a start frame number, an initial sleep window, and a listening interval.

26. The computer-program product of claim 22, wherein:
the code for performing operations related to handover comprises code for initiating handover to the target BS; and
the code for taking action to ensure the sleep interval coincides with the timing of the paging cycle in the second RAT comprises code for sending a ranging request to the target BS.

27. The computer-program product of claim 26, wherein the code for sending the ranging request comprises code for sending a recalculated start frame number and resending an initial sleep window and a listening interval.

28. The computer-program product of claim 22, wherein the code for determining an expected timing of a paging cycle in the second RAT comprises determining a delay from a current frame number of the serving BS in the first RAT to the start of the next paging cycle interval in the second RAT.

* * * * *